United States Patent
Fisher

(10) Patent No.: US 10,208,866 B2
(45) Date of Patent: Feb. 19, 2019

(54) RELIEF VALVE

(71) Applicant: Hawkeye Industries Inc., Edmonton (CA)

(72) Inventor: Brent Fisher, Edmonton (CA)

(73) Assignee: Hawkeye Industries Inc., Edmonton (CA)

( * ) Notice: Subject to any disclaimer, the term of this patent is extended or adjusted under 35 U.S.C. 154(b) by 98 days.

(21) Appl. No.: 15/413,391

(22) Filed: Jan. 23, 2017

(65) Prior Publication Data

US 2018/0209556 A1 Jul. 26, 2018

(51) Int. Cl.
| F16K 17/12 | (2006.01) |
| F16K 17/194 | (2006.01) |
| F16K 17/196 | (2006.01) |
| F16K 24/06 | (2006.01) |

(52) U.S. Cl.
CPC .......... *F16K 17/194* (2013.01); *F16K 17/196* (2013.01); *F16K 24/06* (2013.01)

(58) Field of Classification Search
CPC ....... F16K 17/194; F16K 17/196; F16K 24/06
USPC ......................................................... 137/513
See application file for complete search history.

(56) References Cited

U.S. PATENT DOCUMENTS

| 1,030,447 A * | 6/1912 | Allen ..................... F16K 15/148 |
| | | 137/102 |
| 1,524,257 A * | 1/1925 | Kensig ..................... C02F 1/687 |
| | | 137/110 |
| 2,178,901 A * | 11/1939 | Webster .................. F16K 17/04 |
| | | 137/513 |
| 2,971,531 A | 2/1961 | Jurs et al. |
| 3,256,903 A | 6/1966 | Svensson |
| 5,125,430 A | 6/1992 | Petersen et al. |
| 5,819,793 A | 10/1998 | Rajewski |

(Continued)

FOREIGN PATENT DOCUMENTS

| CN | 201129489 | 10/2008 |
| WO | 2011025351 | 3/2011 |

OTHER PUBLICATIONS

"Protego Pressure/Vacuum Relief Valves", Jun. 2014, vol. 5, 62 pages.

(Continued)

*Primary Examiner* — P. Macade Nichols
(74) *Attorney, Agent, or Firm* — Colby Nipper PLLC

(57) ABSTRACT

A relief valve comprises a valve body, a pallet assembly, a relief pallet seat, a pilot pallet seat and a force element. The valve body has an interior in fluid communication with a container having a container pressure and the valve body having an exterior exposed to an atmosphere. The pallet assembly has a relief pallet having a relief pressure bearing area, a pilot pallet having a pilot pressure bearing area, and a shaft connects the pilot pallet and relief pallet to space the pilot pallet from the relief pallet. The relief pallet seat extends from the valve body towards the interior of the valve body and is configured to seal against the relief pallet to seal the valve body. The pilot pallet seat extending from the valve body and away from the interior of the valve body and is configured to seal against the pilot pallet to form a reservoir between the pilot pallet, the pilot pallet seat and the valve body. The reservoir has an equalization port to provide fluid communication between the valve body and the reservoir.

21 Claims, 5 Drawing Sheets

(56) References Cited

U.S. PATENT DOCUMENTS

| | | |
|---|---|---|
| 5,957,157 A | 9/1999 | Mitchell et al. |
| 7,299,817 B2 | 11/2007 | Gisler et al. |
| 8,714,189 B2 | 5/2014 | Koeroghlian et al. |
| 2008/0223458 A1 | 9/2008 | Rajewski |
| 2014/0216574 A1 | 8/2014 | Onodera |
| 2015/0034179 A1 | 2/2015 | Loga et al. |
| 2015/0144209 A1 | 5/2015 | Bruin et al. |

OTHER PUBLICATIONS

"Venting Atmospheric and Low-Pressure Storage Tanks", API Standard 2000 Fifth Edition, Apr. 1998, Apr. 1998, 52 pages.

* cited by examiner

RELIEF VALVE

TECHNICAL FIELD

Relief valve

BACKGROUND

Relief valves are used in fluid systems to control the internal pressure or vacuum within the system. Pressure relief valves are used to control or limit the amount of pressure in a system by allowing pressurized fluid to flow from an auxiliary passage out of the system. Vacuum relief valves are used to open at a predetermined pressure to admit gas into the system to control the amount of vacuum in a system.

A typical vacuum or pressure relief valve is a direct acting valve. For example, a standard vacuum relief valve design includes a pallet which is forced upwards when pressure in the container drops. The movement of the pallet opens a vent which allows atmospheric gas to enter the container to equalize the pressure difference between atmosphere and container. The movement of the pallet is directly related to the pressure differential between the container and atmosphere.

SUMMARY

In an embodiment, there is provided a relief valve comprising a valve body having an interior in fluid communication with a container having a container pressure and the valve body having an exterior exposed to an atmosphere; a pallet assembly having a relief pallet having a relief pressure bearing area, a pilot pallet having a pilot pressure bearing area, and a shaft connecting the pilot pallet and relief pallet to space the pilot pallet from the relief pallet; a relief pallet seat extending from the valve body towards the interior of the valve body and configured to seal against the relief pallet to seal the valve body; a pilot pallet seat extending from the valve body and away from the interior of the valve body and configured to seal against the pilot pallet to form a reservoir between the pilot pallet, the pilot pallet seat and the valve body, and the reservoir having an equalization port to provide fluid communication between the valve body and the reservoir; a force element connected to and acting on the pallet assembly to maintain the pallet assembly in a sealed position against the relief pallet seat and the pilot pallet seat while the container pressure is above a selected opening pressure; wherein the pilot pressure bearing area is less than the relief pressure bearing area, and the pilot pallet and relief pallet are configured so that when the container pressure is at or below the selected opening pressure, the relief pallet and the relief pallet seat unseal to form a relief port and the pilot pallet and the pilot pallet seat unseal to form a pilot port; and wherein the pilot port and the equalization port are configured such that when the container pressure is at or below the selected opening pressure, the gas flows through the pilot port into the reservoir from the atmosphere at a greater rate than through the equalization port from the reservoir to the valve body.

In various embodiments, there may be included any one or more of the following features: the pilot pallet comprises a pilot pallet seal configured to engage with the pilot pallet seat; the relief pallet comprises a relief pallet seal configured to engage with the relief pallet seat; force element comprises a weight; the force element comprises a biasing member.

In an embodiment, there is provided a relief valve comprising a valve body having an interior in fluid communication with a container having a container pressure and the valve body having an exterior exposed to an atmosphere; a pallet assembly having a relief pallet having a relief pressure bearing area, a pilot pallet having a pilot pressure bearing area, and a shaft connecting the pilot pallet and relief pallet and spacing the pilot pallet from the relief pallet; a relief pallet seat extending from the valve body and away from the valve body and configured to seal against the relief pallet to seal the valve body; a pilot pallet seat extending from the valve body towards the interior of the valve body and configured to seal against the pilot pallet to form a reservoir between the pilot pallet, the pilot pallet seat and the valve body, and the reservoir having an equalization port to provide fluid communication between the reservoir and the atmosphere; a force element connected to and acting on the pallet assembly to maintain the pallet assembly in a sealed position against the relief pallet seat and the pilot pallet seat while the container pressure is below a selected opening pressure; and the pilot pallet and the pilot pallet seat unseal to form a pilot port and the relief pallet and the relief pallet seat unseal to form a relief port; wherein the pilot pressure bearing area is less than the relief pressure bearing area and the pilot pallet and relief pallet are configured such that when the container pressure is at or above the selected opening pressure, the relief pallet and the relief pallet seat unseal to form a relief port and the pilot pallet and the pilot pallet seat unseal to form a pilot port; and wherein the pilot port and the equalization port are configured such that when the container pressure is at or above the selected opening pressure, the gas flows through the pilot port into the reservoir from the valve body at a greater rate than through the equalization port from the reservoir to the atmosphere.

In various embodiments, there may be included any one or more of the following features: the pilot pallet comprises a pilot pallet seal configured to engage with the pilot pallet seat; the relief pallet comprises a relief pallet seal configured to engage with the relief pallet seat; the force element comprises a weight; the force element comprises a biasing member.

In an embodiment, there is provided a relief valve comprising: a valve body having an interior in fluid communication with a container having a container pressure and the valve body having an exterior exposed to an atmosphere; a pallet assembly having a relief pallet having a relief pressure bearing area, a pilot pallet having a pilot pressure bearing area, and a shaft connecting the pilot pallet and relief pallet to space the pilot pallet from the relief pallet; a relief pallet seat extending from the valve body away from valve body and configured to seal against the relief pallet to seal the valve body; a reservoir attached to the valve body and separated by the pallet assembly, the reservoir having a pilot pallet seat configured to seal against the pilot pallet, and the reservoir having an equalization port to provide a fluid connection between the valve body and the reservoir; a force element connected to and acting on the pallet assembly to maintain the pallet assembly in a sealed position against the relief pallet seat and the pilot pallet seat while the container pressure is below a selected opening pressure; and wherein the pilot pressure bearing area is less than the relief pressure bearing area and the pilot pallet and relief pallet are configured such that when the container pressure is at or above the selected opening pressure, the relief pallet and the relief pallet seat unseal to form a relief port and the pilot pallet and the pilot pallet seat unseal to form a pilot port; and wherein the pilot port and the equalization port are configured such that when the container pressure is at or above the selected opening pressure, gas flows through the pilot port from the reservoir into the atmosphere at a greater rate than through the equalization port from the valve body into the reservoir.

In various embodiments, there may be included any one or more of the following features: the pilot pallet comprises a pilot pallet seal configured to engage with the pilot pallet seat; the relief pallet comprises a relief pallet seal configured to engage with the relief pallet seat; the force element comprises a weight; the force element comprises a biasing member; the equalization port is formed by a channel extending through the shaft; the equalization port is formed by a connecting element which provides a fluid connection between the valve body and the reservoir;

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
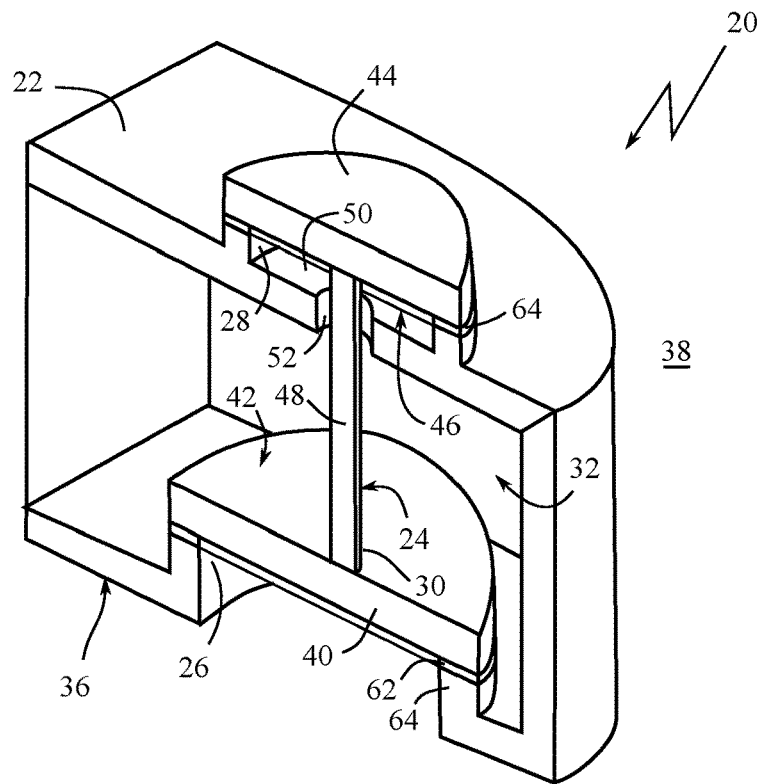
FIG. 1 is a perspective view in cross-sectional of an embodiment of a vacuum relief valve, the valve shown in a closed configuration.
Figure 2:
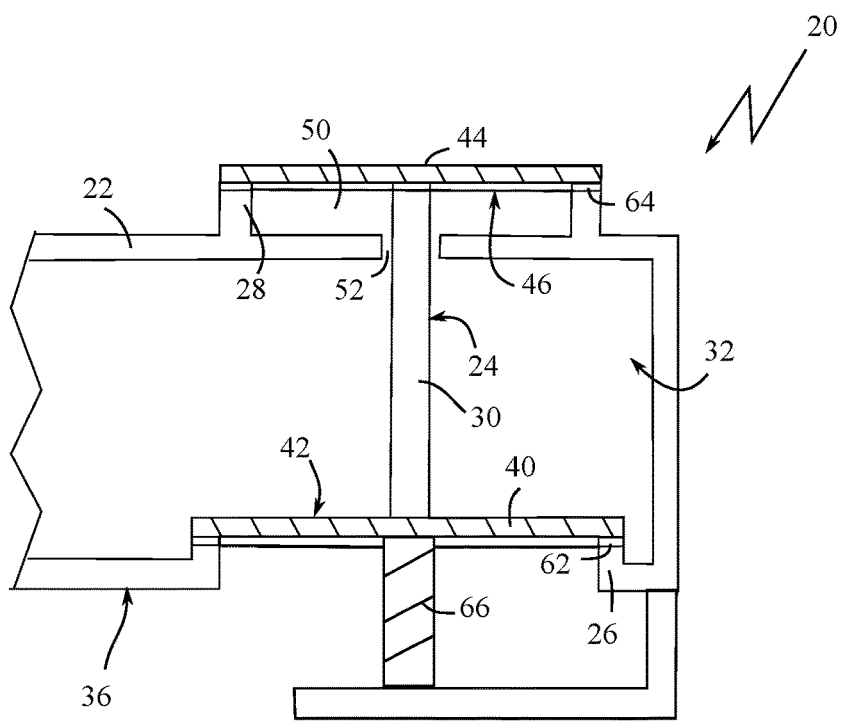
FIG. 2 is a cross-sectional view of an embodiment of a vacuum relief valve, the valve shown in a closed configuration.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Embodiments of a relief valve 20 are shown in FIGS. 1-7. The relief valve 20 comprises a valve body 22, a pallet assembly 24, a relief pallet seat 26, a pilot pallet seat 28 and a force element 30. The valve body 22 has an interior 32 in fluid communication with a container 34 and the valve body 22 has an exterior 36 exposed to an atmosphere 38. The container 34 has a container pressure. The pallet assembly 24 has a relief pallet 40 having a relief pressure bearing area 42, a pilot pallet 44 having a pilot pressure bearing area 46, and a shaft 48 connecting the pilot pallet 44 and relief pallet 40 to space the pilot pallet 44 from the relief pallet 40. The relief pallet seat 26 extends from the valve body 22 towards the interior 32 of the valve body 22 and is configured to seal against the relief pallet 40 to seal the valve body 22. The pilot pallet seat 28 extends from the valve body 22 and away from the interior 32 of the valve body 22 and is configured to seal against the pilot pallet 44 to form a reservoir 50 between the pilot pallet 44, the pilot pallet seat 28 and the valve body 22. The reservoir 50 has an equalization port 52 to provide fluid communication between the valve body 22 and the reservoir 50. The force element 30 is connected to and acts on the pallet assembly 24 to maintain the pallet assembly 24 in a sealed position against the relief pallet seat 26 and the pilot pallet seat 28 while the container pressure is above a selected opening pressure. The pilot pressure bearing area 46 is less than the relief pressure bearing area 42 and the relief pallet 40 and pilot pallet 44 are configured such that when the container pressure is at or below the selected opening pressure, the relief pallet 40 and the relief pallet seat 26 unseal to form a relief port 54 and the pilot pallet 44 and the pilot pallet seat 28 unseal to form a pilot port 56. The pilot port 56 and the equalization port 52 are configured such that when the container pressure is at or below the selected opening pressure, gas flows through the pilot port 56 into the reservoir 50 from the atmosphere 38 at a greater rate than through the equalization port 52 from the reservoir 50 to the valve body 22.

The relief pressure bearing area 42 is the area of the relief pallet 40 and the pilot pressure bearing area 46 is the pilot pallet 44.

The embodiment of a relief valve 20 shown in FIGS. 1-7 operates to relieve vacuum pressure in the container 34. In a first stage, shown in FIGS. 1-5, the relief valve 20 is closed and both the relief pallet 40 and the pilot pallet 44 are sealed. The force caused by the vacuum in the container 34 and valve body 22 acts on both pallets 40 and 44 in opposite directions. Because the pilot pressure bearing area 46 is smaller than the relief pressure bearing area 42, the resultant force acts on the pallet assembly 24 in a direction tending to urge the relief pallet 40 and pilot pallet 44 away from, respectively, the relief pallet seat 26 and pilot pallet seat 28. This resultant force is less than the opposing force generated by the force element 30. At this stage, the pressure in the reservoir 50 is equal to the pressure in the container 34 and valve body 22.

Figure 6:
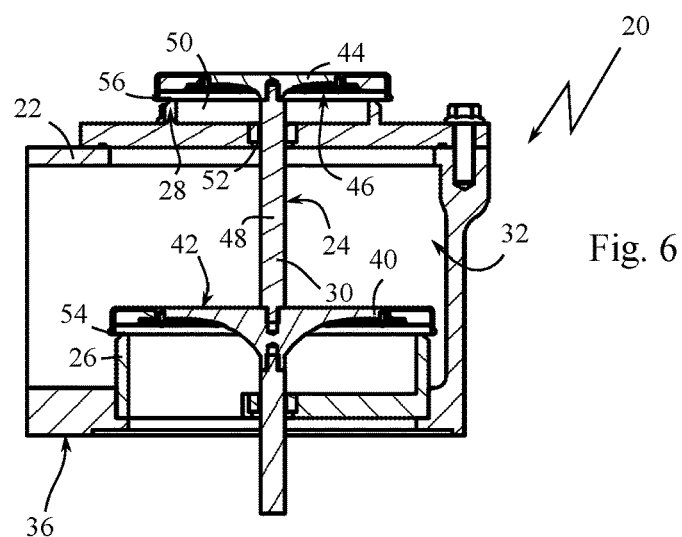
FIG. 6 is a cross-sectional view of the embodiment of FIG. 1 in a partially open position.
Figure 7:
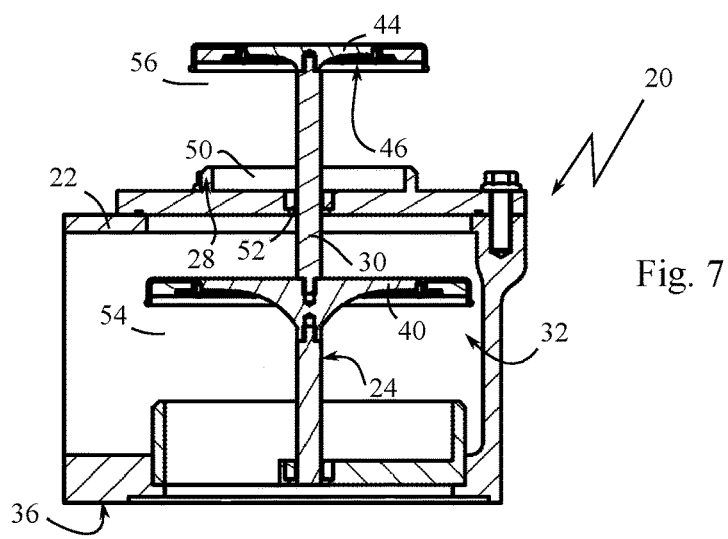
FIG. 7 is a cross-sectional view of the embodiment of FIG. 1 in a fully open position.

In a second stage, shown in FIG. 6, the container pressure has dropped to the selected opening pressure (also known as the set pressure), and the force on the pallet assembly 24 due to the vacuum in the container 34 is equal to or slightly greater than the force of the force element 30. Set pressure may be set as or close to the maximum allowable working vacuum of the container 34 relative to the atmosphere 38. The seals of both pallets 40 and 44 are broken and the pallet assembly 24 begins to lift. Gas begins to flow through the pilot port 56 from the atmosphere 38 to the reservoir 50 and to the valve body 22 from the atmosphere 38 through the relief port 54. The inflow of gas begins to relieve the vacuum in the valve body 22, container 34 and the reservoir 50. Since the rate of gas flow through the pilot port 56 into the reservoir 50 from the atmosphere 38 is greater than the outflow of gas through the equalization port 52 from the reservoir 50 to the valve body 22, the pressure within the reservoir 50 increases.

In a third stage, the pressure in the reservoir 50 has equalized with atmospheric pressure. The force across the pilot pressure bearing area 46 caused by the vacuum drops to almost zero due to the rapid increase in pressure in the reservoir 50, and the force generated by the pressure in the reservoir 50 rapidly overcomes the force of the force element 30 and the force of the vacuum pressure across the relief pressure bearing area 42 of the relief pallet 40. The relief valve 20 moves to the fully open position, shown in FIG. 7, in which the relief port 54 allows gas to flow into the container 34 rapidly to relieve the vacuum in the container 34. Gas flows almost unrestricted into the reservoir 50 from the atmosphere 38 and slowly leaks through the equalization port 52 into the valve body 22 but not fast enough to decrease the pressure in the reservoir 50. The fully open position may be reached when the container pressure is near the set pressure.

In a fourth stage, shown in FIG. 6, as the pressure in the container 34 increases and the pressure differential between the container 34 and atmosphere 38 decreases, so too does the gas flow into the container 34 through the relief port 54. As a result the pallet assembly 24 gradually lowers until it reseats. The container pressure at which it reseats is the closing pressure and occurs when the force due to stagnation pressure on the relief pallet 40 decreases until it is equal to the force of the force element 30 acting on the pallet assembly 24. Gas flow into the reservoir 50 is gradually restricted, but this does not significantly affect the pressure in the reservoir 50 until the pilot pallet 44 is almost seated since the flow into the valve body 22 through the equalization port 52 is so small.

Figure 5:
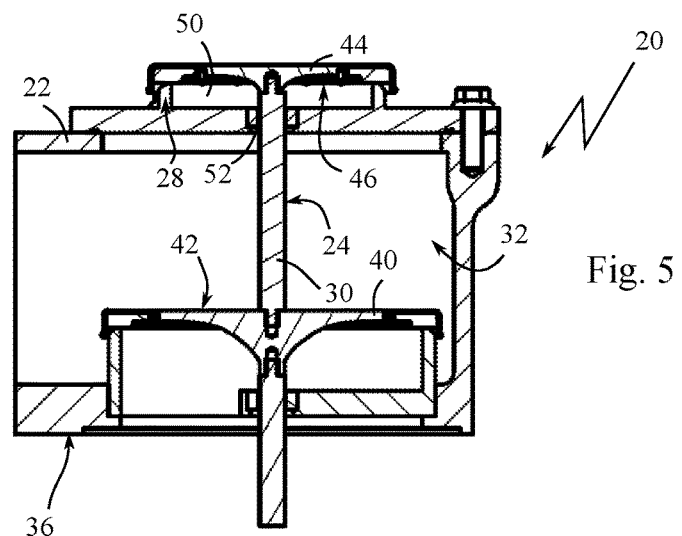
FIG. 5 is a cross-sectional view of an embodiment of the vacuum relief valve of FIG. 1 in a closed position.

In a fifth stage, shown in FIG. 5, the valve 20 has reseated and the container 34 is at the closing pressure. There is no flow through the relief port 54 or into the reservoir 50 from atmosphere 38. Gas flows from the reservoir 50 into the container 34 and drops the pressure of the reservoir 50 from near atmospheric pressure to the closing pressure. This increases the sealing force on the pallet assembly 24. This results in the relief valve 20 being reset to the same state in the first stage before it opened. The difference between the opening pressure and closing pressure (blowdown) of the valve 20 is non-zero, and may be equal to the ratio of the pilot pressure bearing area 46 and the relief pressure bearing area 42.

Figure 8:
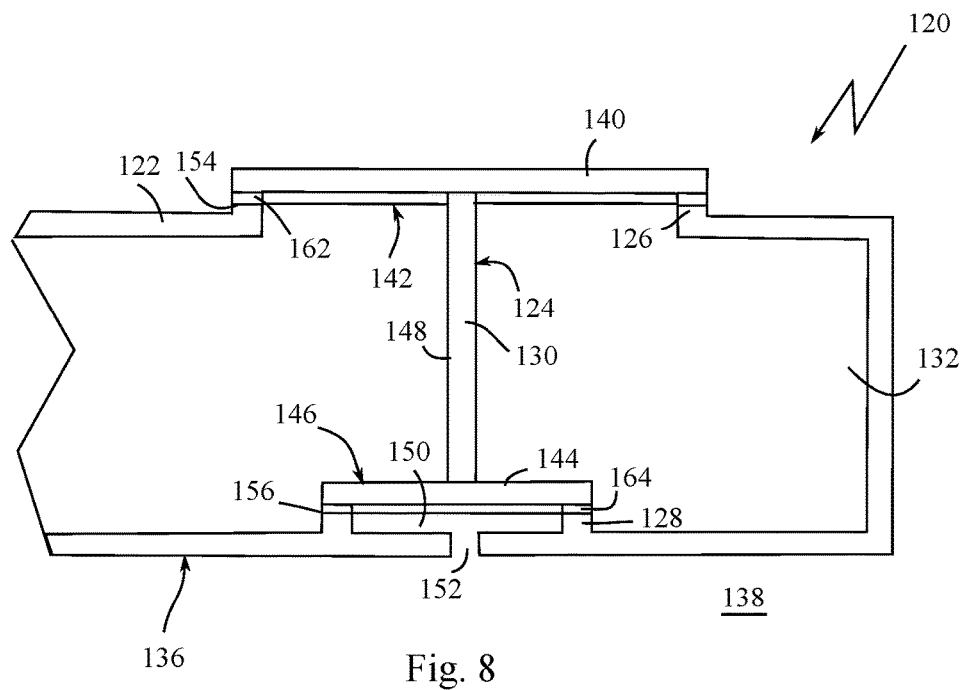
FIG. 8 is a cross-sectional view of an embodiment of a pressure relief valve.
Figures 9, 10:
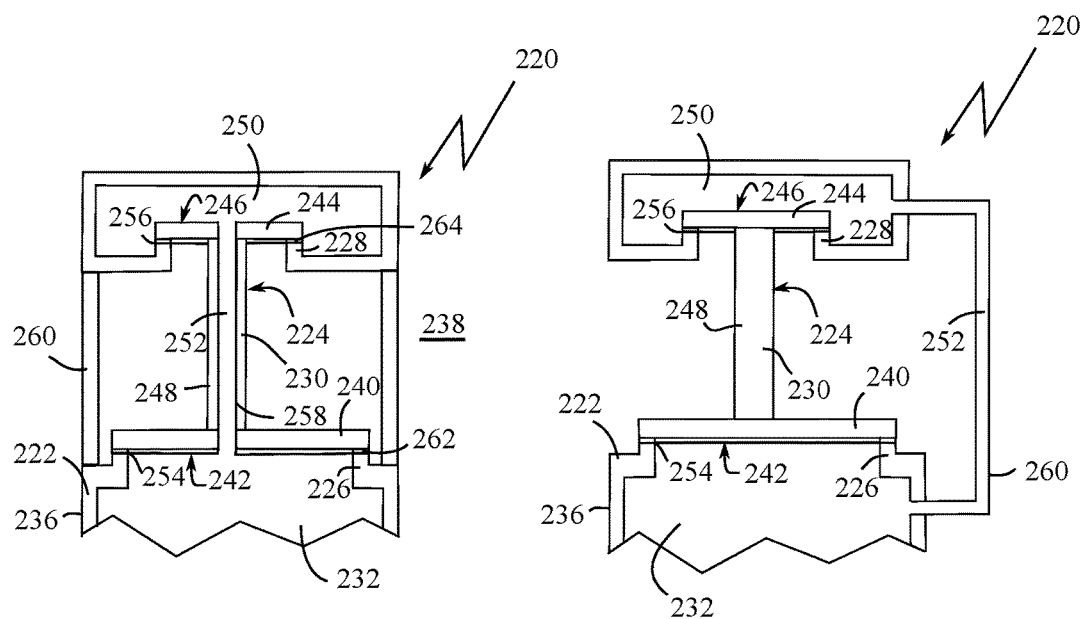
FIG. 9 is a cross-sectional view of an embodiment of a pressure relief valve.
FIG. 10 is a cross-sectional view of an embodiment of a pressure relief valve.

Embodiments of a relief valve 120, 220 for relieving pressure are shown in FIGS. 8-10. The pressure relief valves of FIGS. 8-10 operate on the same principals as the vacuum relief valve of FIGS. 1-7.

In the embodiment of FIG. 8, the relief valve 120 comprises a valve body 122, a pallet assembly 124, a relief pallet seat 126, a pilot pallet seat 128, and a force element 130. The valve body 122 has an interior 132 in fluid communication with a container (not shown) having a container pressure and the valve body 122 having an exterior 136 exposed to an atmosphere 138. The pallet assembly 124 has a relief pallet 140 having a relief pressure bearing area 142, a pilot pallet 144 having a pilot pressure bearing area 146, and a shaft 148 connecting the pilot pallet 144 and relief pallet 140 and spacing the pilot pallet 140 from the relief pallet 144. The relief pallet seat 126 extends from the valve body 122 and away from the valve body 122 and is configured to seal against the relief pallet 140 to seal the valve body 122. The pilot pallet seat 128 extends from the valve body 122 towards the interior 132 of the valve body 122 and is configured to seal against the pilot pallet 144 to form a reservoir 150 between the pilot pallet 144, the pilot pallet seat 128 and the valve body 122. The reservoir 150 has an equalization port 152 to provide fluid communication between the reservoir 150 and the atmosphere 138. The force element 130 is connected to and acts on the pallet assembly 124 to maintain the pallet assembly 124 in a sealed position against the relief pallet seat 126 and the pilot pallet seat 128 while the container pressure is below a selected opening pressure. The pilot pallet 144 and the pilot pallet seat 128 unseal to form a pilot port 144 and the relief pallet 140 and the relief pallet seat 142 unseal to form a relief port 154. The pilot pressure bearing area 146 is less than the relief pressure bearing area 142 and the pilot pallet 144 and relief pallet 140 are configured such that when the container pressure is at or above the selected opening pressure, the relief pallet 140 and the relief pallet seat 126 unseal to form a relief port 154 and the pilot pallet 144 and the pilot pallet seat 146 unseal to form a pilot port 156. The pilot port 156 and the equalization port 152 are configured such that when the container pressure is at or above the selected opening pressure, the gas flows through the pilot port 156 into the reservoir 150 from the valve body 122 at a greater rate than through the equalization port 152 from the reservoir 150 to the atmosphere 138.

In a first stage, the relief valve 120 is closed and both the relief pallet 140 and the pilot pallet 144 are sealed. The force caused by the pressure in the container and valve body 122 acts on both pallets 140 and 144 in opposite directions. Because the pilot pressure bearing area 146 is smaller than the relief pressure bearing area 142, the resultant force acts on the pallet assembly 124 in a direction tending to urge the relief pallet 140 and pilot pallet 144 away from, respectively, the relief pallet seat 126 and pilot pallet seat 128. This resultant force against the pallet assembly 124 is less than the opposing force generated by the force element 130. At this stage, the pressure in the reservoir 150 is equal to the pressure in the atmosphere 138.

In a second stage, the container pressure has risen to the selected opening pressure (also known as the set pressure), and the force on the pallet assembly 124 due to the pressure in the container is equal or slightly greater than the force of the force element 130. Set pressure may be set as or close to the maximum allowable working pressure of the container relative to the atmosphere 138. The seals of both pallets 140 and 144 are broken and the pallet assembly 124 begins to lift. Gas begins to flow through the pilot port 156 from the valve body 122 to the reservoir 150 and through the relief port 154 from the valve body 122 to the atmosphere 138. The outflow of gas begins to relieve the pressure in the valve body 122, container and reservoir 150. Since the rate of gas flow through the pilot port 156 out of the valve body 122 to the reservoir 50 is greater than the outflow of gas through the equalization port 152 from the reservoir 150 to the atmosphere 138, the pressure within the reservoir 150 increases.

In a third stage, the pressure in the reservoir 150 has equalized with the pressure in the container. The force against the pilot pressure bearing area 146 caused by the pressure in the container drops to almost zero due to the rapid increase in pressure in the reservoir 150, and the force generated by the pressure in the reservoir 150 against the pilot pallet 144 rapidly overcomes the force of the force element 130 and pressure in the container across the pilot pressure bearing area 146. The relief valve 120 moves to a fully open position in which the relief port 154 allows gas to flow out of the container rapidly to relieve the pressure in the container. Gas flows almost unrestricted out of the container into the reservoir 150 and slowly leaks through the equalization port 152 into the atmosphere 138 but not fast enough to decrease the pressure in the reservoir 150. The fully open position may be reached when the container pressure is near the set pressure.

In a fourth stage, as the pressure in the container decreases and the pressure differential between the container and atmosphere 138 decreases, so too does the gas flow out of the container through the relief port 154. As a result the pallet assembly 124 gradually lowers until it reseats. The container pressure at which it reseats is the closing pressure and occurs when the force due to the stagnation pressure on the relief pallet 140 decreases until it is equal to the force of the force element 130 acting on the pallet assembly 124. Gas flow into the reservoir 150 is gradually restricted, but this does not significantly affect the pressure in the reservoir 150 until the pilot pallet 146 is almost seated since the flow into the atmosphere 138 through the equalization port 152 is so small.

In a fifth stage, the valve 120 has reseated and the container is at the closing pressure. There is no flow through the relief port 154 or through the pilot port 156. Gas flows from the reservoir 150 into the atmosphere 138 and decreases the pressure of the reservoir 150 from near the container pressure and closing pressure to atmospheric pressure. This increases the sealing force on the pallet assembly 124, and results in the relief valve 120 being reset to the same state in the first stage before it opened. The difference between the opening pressure and closing pressure (blowdown) of the valve 120 is non-zero, and may be equal to the ratio of the pilot pressure bearing area 146 and the relief pressure bearing area 142.

In the embodiment of a relief valve shown in FIGS. 9 and 10, the relief valve 220 is a pressure relief valve. The relief valve 220 comprises a valve body 222, a pallet assembly 224, a relief pallet seat 226, a reservoir 250 and a force element 230. The valve body 222 has an interior 232 in fluid communication with a container (not shown) having a container pressure and the valve body 222 has an exterior 236 exposed to an atmosphere 238. The pallet assembly 224 has a relief pallet 240 having a relief pressure bearing area 242, a pilot pallet 244 having a pilot pressure bearing area 246, and a shaft 248 connecting the pilot pallet 244 and relief pallet 240 to space the pilot pallet 244 from the relief pallet 240. The relief pallet seat 226 extends from the valve body 222 away from valve body 222 and is configured to seal against the relief pallet 240 to seal the valve body 222. The reservoir 250 is attached to the valve body 222 and separated by the pallet assembly 224. The reservoir 250 has a pilot pallet seat 228 configured to seal against the pilot pallet 244 and an equalization port 252 to provide a fluid connection between the valve body 222 and the reservoir 250. The force element 230 connects to and acts on the pallet assembly 224 to maintain the pallet assembly 224 in a sealed position against the relief pallet seat 226 and the pilot pallet seat 228 while the container pressure is below a selected opening pressure. The pilot pressure bearing area 246 is less than the relief pressure bearing area 242 and the pilot pallet 244 and relief pallet 240 are configured such that when the container pressure is at or above the selected opening pressure, the relief pallet 240 and the relief pallet seat 226 unseal to form a relief port 254 and the pilot pallet 244 and the pilot pallet seat 228 unseal to form a pilot port 256. The pilot port 256 and the equalization port 252 are configured such that when the container pressure is at or above the selected opening pressure, gas flows through the pilot port 256 from the reservoir 250 into the atmosphere 238 at a greater rate than through the equalization port 252 from the valve body 222 into the reservoir 250.

In a first stage, the relief valve 220 is closed and both the relief pallet 240 and the pilot pallet 244 are sealed. The force caused by the pressure in the container and valve body 222 acts on both pallets 240 and 244 in opposite directions. Because the pilot pressure bearing area 246 is smaller than the relief pressure bearing area 242, the resultant force acts on the pallet assembly 224 in a direction tending to urge the relief pallet 240 and pilot pallet 244 away from, respectively, the relief pallet seat 226 and pilot pallet seat 228. This resultant force against the pallet assembly 224 is less than the opposing force generated by the force element 230. At this stage, the pressure in the reservoir 250 is equal to the pressure in the container and valve body 222.

In a second stage, the container pressure has risen to the selected opening pressure (also known as the set pressure), and the force on the pallet assembly 224 due to the pressure in the container is equal or slightly greater than the force of the force element 230. Set pressure may be set as or close to the maximum allowable working pressure of the container relative to the atmosphere 238. The seals of both pallets 240 and 244 are broken and the pallet assembly 224 begins to lift. Gas begins to flow through the pilot port 256 from the reservoir 250 to the atmosphere 238 and from the valve body 222 to the atmosphere 238 through the relief port 254. The outflow of gas begins to relieve the pressure in the valve body 222, container and the reservoir 250. Since the rate of gas flow through the pilot port 256 from the reservoir 250 to the atmosphere 238 is greater than the rate of gas flow through the equalization port 252 from the valve body 222 to the reservoir 250, the pressure within the reservoir 250 decreases.

In a third stage, the pressure in the reservoir 250 has equalized with atmospheric pressure. The force across the pilot pressure bearing area 246 caused by the gas pressure within the reservoir 250 drops to almost zero due to the rapid decrease in pressure in the reservoir 250, and the force generated by the container pressure against the relief pressure bearing area 242 rapidly overcomes the force of the force element 230 and the force of the reservoir pressure on the pilot pallet 244. The relief valve 220 moves to the fully open position in which the relief port 254 allows gas to flow out of the container to rapidly relieve the pressure in the container. Gas flows almost unrestricted between the reservoir 250 and the atmosphere 238 and slowly leaks from the interior 232 of the valve body 222 through the equalization port 252 into the reservoir 250 but not fast enough to increase the pressure in the reservoir 250. The fully open position may be reached when the container pressure is near the set pressure.

In a fourth stage, as the pressure in the container decreases and the pressure differential between the container and atmosphere 238 decreases, so too does the gas flow out of the container through the relief port 254. As a result the pallet assembly 224 gradually lowers until it reseats. The container pressure at which it reseats is the closing pressure and occurs when the force due to the stagnation pressure on the relief pallet 240 decreases until it is equal to the force of the force element 230 acting on the pallet assembly 224. Gas flow into the reservoir 250 is gradually restricted, but this does not significantly affect the pressure in the reservoir 250 until the pilot pallet 256 is almost seated since the flow into the reservoir 250 through the equalization port 252 is so small.

In a fifth stage, the valve 220 has reseated and the container is at the closing pressure. There is no flow through the relief port 254 or into the reservoir 250 from atmosphere 238. Gas flows from the interior 232 of the valve body 222 into the reservoir 250 and raises the pressure of the reservoir 250 from near atmospheric pressure to the closing pressure. This increases the sealing force on the pallet assembly 224, and results in the relief valve 220 being reset to the same state in the first stage before it opened. The difference between the opening pressure and closing pressure (blow-down) of the valve 220 is non-zero, and may be equal to the ratio of the pilot pressure bearing area 246 and the relief pressure bearing area 242.

In FIGS. 9 and 10, a connecting element 260 may also support the reservoir 250 at a fixed distance from the valve body 222. As shown in FIG. 9, the equalization port 252 may be formed by a channel 258 extending through the shaft 248. As shown FIG. 10, the equalization port 252 may be formed by the connecting element 260 which provides a fluid connection between the valve body 222 and the reservoir 250.

In each embodiment, the relief pallet 40, 140, 240 may comprise a relief pallet seal 62, 162, 262 configured to engage with the relief pallet seat 26, 126, 226 and the pilot pallet 44, 144, 244 may comprise a pilot pallet seal 64, 164, 264 configured to engage with the pilot pallet seat 28, 128, 228.

In each embodiment, the force element 30, 130, 230 may be a weight or a biasing element and may be integral to the pallet assembly 24, 124, 224. For example, the shaft 48, 148, 248 may be weighted to provide gravitational force to sealingly engage the pilot pallet 44, 144, 244 and relief pallet 26, 126, 226 respectively with the pilot pallet seat 64, 164, 264 and the relief pallet seat 26, 126, 226, as in FIGS. 1 and 3-8. The force element 30, 130, 230 may be a biasing element 66 such as a spring, shown in FIG. 2. The force element 30, 130, 230 may be adjusted to change the set pressure of the relief valve 20, 120, 220.

An embodiment of a vacuum relief valve of FIGS. 1-7 may be combined with a pressure relief valve to form a pressure and vacuum relief vent which acts to relieve excess differential between a container and the atmosphere. The pressure relief valve may be any one of the embodiments of a pressure relief valve shown in FIGS. 8-10 or any other pressure relief valve. For example, in FIG. 3, the embodiment of a vacuum valve of FIG. 1 is combined with a standard pressure relief valve 68. Similarly, the embodiment of a pressure relief valve of FIGS. 8-10 may be combined with a vacuum relief valve, including the embodiment of a vacuum relief of FIGS. 1-7, to form a pressure and vacuum relief valve.

Figure 11:
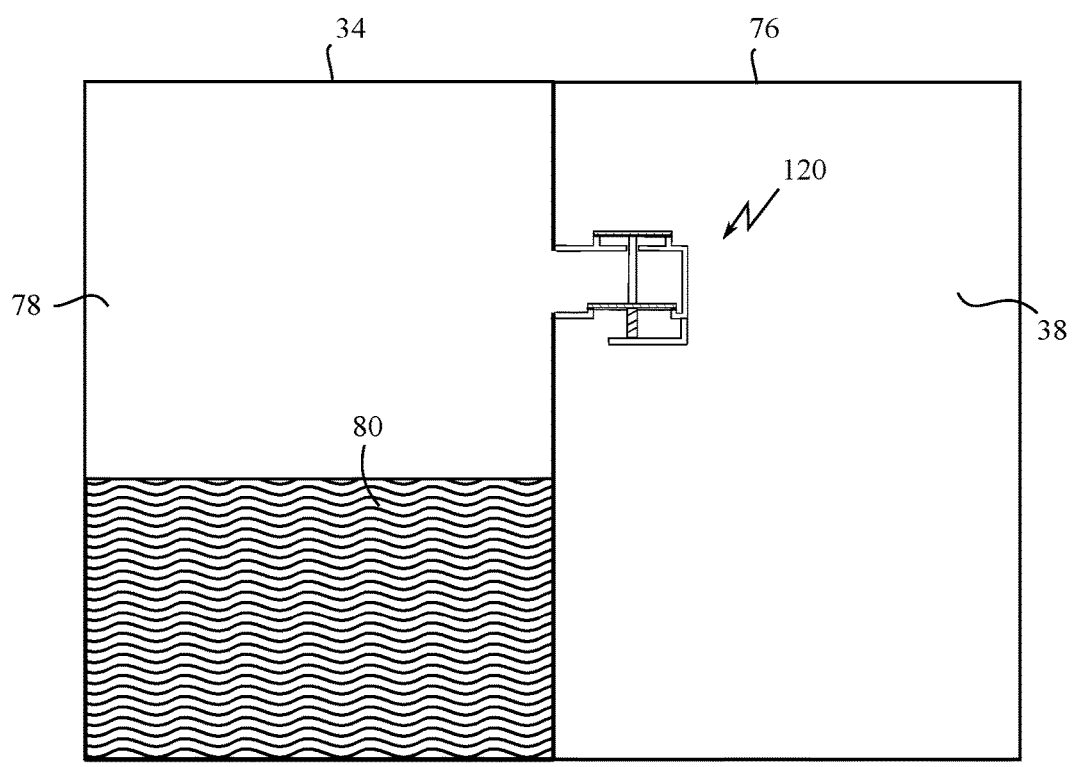
FIG. 11 illustrates an exemplary use of a pressure relief valve.

The relief valve 20, 120, 220 may be used on oilfield storage tanks to keep the internal container pressure within a safe range. The atmosphere 38, 138, 238 may be contained within a fluid receptacle 76, as shown for example in FIG. 11 for relief valve 120 and atmosphere 38. The relief valve 20, 120, 220 may maintain a prescribed pressure differential between the container 34 and the fluid receptacle 76. In each of the embodiments, reference to the valve body 20, 120, 220 being connected to a container 34 may include the valve body 22, 122, 222 being connected to the headspace 78 of the container 34. For example, the container 34 may be partially filled with liquid 80 such as oil. The container 34 may be a tank, for example an oil tank. The container 34 may be a first compartment of a tank and the fluid receptacle 76 may be a second compartment of a tank. The relief valve 20, 120, 220 may be located inline in a pipe system.

Figure 3:
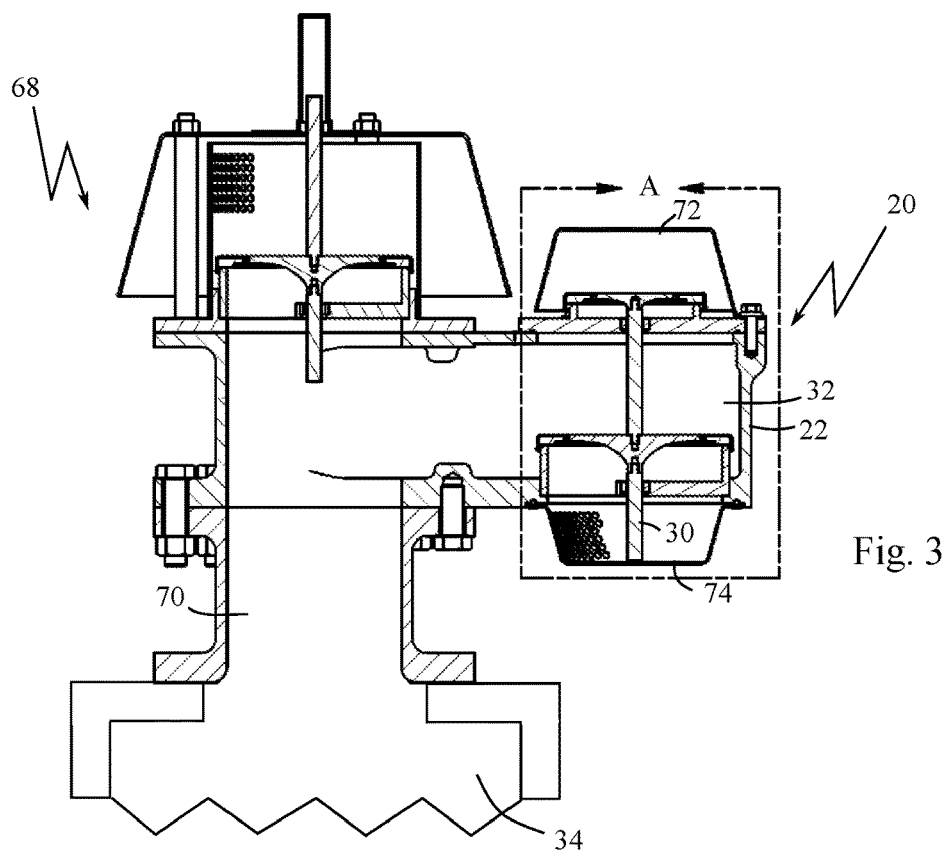
FIG. 3 is a cross-sectional view of the embodiment of the vacuum, relief valve of FIG. 1 combined with direct acting pressure valve.
Figure 4:
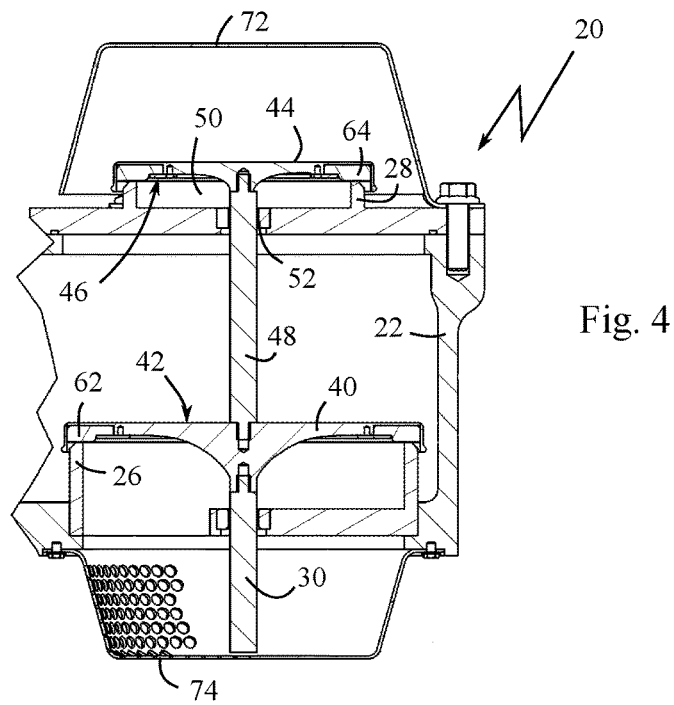
FIG. 4 is a detail view of the embodiment of the vacuum relief valve of FIG. 3 within line A.

As shown in FIG. 3, relief valve 20 may have a valve inlet/outlet 70. The relief valve 20 may have a weather hood 72 and inlet screen 74 to protect the relief valve 20 from weather damage and to prevent matter from clogging the valve 20, as shown in FIGS. 3 and 4. Relief valves 120, 220 may also have a weather hood and inlet screen.

What is claimed is:

1. A relief valve comprising:
   a valve body having an interior in fluid communication with a container having a container pressure and the valve body having an exterior exposed to an atmosphere;
   a pallet assembly having a relief pallet having a relief pressure bearing area, a pilot pallet having a pilot pressure bearing area, and a shaft connecting the pilot pallet and relief pallet to space the pilot pallet from the relief pallet;
   a relief pallet seat extending from the valve body towards the interior of the valve body and configured to seal against the relief pallet to seal the valve body;
   a pilot pallet seat extending from the valve body and away from the interior of the valve body and configured to seal against the pilot pallet to form a reservoir between the pilot pallet, the pilot pallet seat and the valve body, and the reservoir having an equalization port to provide fluid communication between the valve body and the reservoir;
   a force element connected to and acting on the pallet assembly to maintain the pallet assembly in a sealed position against the relief pallet seat and the pilot pallet seat while the container pressure is above a selected opening pressure;
   wherein the pilot pressure bearing area is less than the relief pressure bearing area, and the pilot pallet and relief pallet are configured so that when the container pressure is at or below the selected opening pressure, the relief pallet and the relief pallet seat unseal to form a relief port and the pilot pallet and the pilot pallet seat unseal to form a pilot port; and
   wherein the pilot port and the equalization port are configured such that when the container pressure is at or below the selected opening pressure, a gas flows through the pilot port into the reservoir from the atmosphere at a greater rate than through the equalization port from the reservoir to the valve body.

2. The relief valve of claim 1 wherein the pilot pallet comprises a pilot pallet seal configured to engage with the pilot pallet seat.

3. The relief valve of claim 1 wherein the relief pallet comprises a relief pallet seal configured to engage with the relief pallet seat.

4. The relief valve of claim 1 wherein the force element comprises a weight.

5. The relief valve of claim 1 wherein the force element comprises a biasing member.

6. The relief valve of claim 1 wherein the atmosphere is contained within a fluid receptacle.

7. The relief valve of claim 6 wherein the container is a first compartment of a tank and the fluid receptacle is a second compartment of a tank.

8. The relief valve of claim 1 wherein the container is a tank.

9. The relief valve of claim 1 wherein relief valve is located inline in a pipe system.

10. A relief valve comprising:
    a valve body having an interior in fluid communication with a container having a container pressure and the valve body having an exterior exposed to an atmosphere;
    a pallet assembly having a relief pallet having a relief pressure bearing area, a pilot pallet having a pilot pressure bearing area, and a shaft connecting the pilot pallet and relief pallet and spacing the pilot pallet from the relief pallet;

a relief pallet seat extending from the valve body and away from the valve body and configured to seal against the relief pallet to seal the valve body;

a pilot pallet seat extending from the valve body towards the interior of the valve body and configured to seal against the pilot pallet to form a reservoir between the pilot pallet, the pilot pallet seat and the valve body, and the reservoir having an equalization port to provide fluid communication between the reservoir and the atmosphere;

a force element connected to and acting on the pallet assembly to maintain the pallet assembly in a sealed position against the relief pallet seat and the pilot pallet seat while the container pressure is below a selected opening pressure; and the pilot pallet and the pilot pallet seat unseal to form a pilot port and the relief pallet and the relief pallet seat unseal to form a relief port;

wherein the pilot pressure bearing area is less than the relief pressure bearing area and the pilot pallet and relief pallet are configured such that when the container pressure is at or above the selected opening pressure, the relief pallet and the relief pallet seat unseal to form a relief port and the pilot pallet and the pilot pallet seat unseal to form a pilot port; and wherein the pilot port and the equalization port are configured such that when the container pressure is at or above the selected opening pressure, a gas flows through the pilot port into the reservoir from the valve body at a greater rate than through the equalization port from the reservoir to the atmosphere.

11. The relief valve of claim 10 wherein the pilot pallet comprises a pilot pallet seal configured to engage with the pilot pallet seat.

12. The relief valve of claim 10 wherein the relief pallet comprises a relief pallet seal configured to engage with the relief pallet seat.

13. The relief valve of claim 10 wherein the force element comprises a weight.

14. The relief valve of claim 10 wherein the force element comprises a biasing member.

15. A relief valve comprising:

a valve body having an interior in fluid communication with a container having a container pressure and the valve body having an exterior exposed to an atmosphere;

a pallet assembly having a relief pallet having a relief pressure bearing area, a pilot pallet having a pilot pressure bearing area, and a shaft connecting the pilot pallet and relief pallet to space the pilot pallet from the relief pallet;

a relief pallet seat extending from the valve body away from valve body and configured to seal against the relief pallet to seal the valve body;

a reservoir attached to the valve body and separated by the pallet assembly, the reservoir having a pilot pallet seat configured to seal against the pilot pallet, and the reservoir having an equalization port to provide a fluid connection between the valve body and the reservoir;

a force element connected to and acting on the pallet assembly to maintain the pallet assembly in a sealed position against the relief pallet seat and the pilot pallet seat while the container pressure is below a selected opening pressure; and wherein the pilot pressure bearing area is less than the relief pressure bearing area and the pilot pallet and relief pallet are configured such that when the container pressure is at or above the selected opening pressure, the relief pallet and the relief pallet seat unseal to form a relief port and the pilot pallet and the pilot pallet seat unseal to form a pilot port; and wherein the pilot port and the equalization port are configured such that when the container pressure is at or above the selected opening pressure, gas flows through the pilot port from the reservoir into the atmosphere at a greater rate than through the equalization port from the valve body into the reservoir.

16. The relief valve of claim 15 wherein the pilot pallet comprises a pilot pallet seal configured to engage with the pilot pallet seat.

17. The relief valve of claim 15 wherein the relief pallet comprises a relief pallet seal configured to engage with the relief pallet seat.

18. The relief valve of claim 15 wherein the force element comprises a weight.

19. The relief valve of claim 15 wherein the force element comprises a biasing member.

20. The relief valve of claim 15 wherein the equalization port is formed by a channel extending through the shaft.

21. The relief valve of claim 15 wherein the equalization port is formed by a connecting element which provides a fluid connection between the valve body and the reservoir.

\* \* \* \* \*